(12) United States Patent
Kirshenbaum

(10) Patent No.: US 7,702,683 B1
(45) Date of Patent: Apr. 20, 2010

(54) ESTIMATING SIMILARITY BETWEEN TWO COLLECTIONS OF INFORMATION

(75) Inventor: Evan R. Kirshenbaum, Mountain View, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 582 days.

(21) Appl. No.: 11/522,656

(22) Filed: Sep. 18, 2006

(51) Int. Cl.
*G06F 17/30* (2006.01)
(52) U.S. Cl. .................... 707/758; 707/718; 707/749
(58) Field of Classification Search ........... 707/3, 707/E17.042, 4, 5, 6, 100, 102
See application file for complete search history.

(56) References Cited

U.S. PATENT DOCUMENTS

| 6,671,771 | B2 * | 12/2003 | Perloff .................... 711/108 |
| 6,934,796 | B1 * | 8/2005 | Pereira et al. ............. 711/108 |
| 7,283,999 | B1 * | 10/2007 | Ramesh et al. ............... 707/6 |
| 2005/0111367 | A1 * | 5/2005 | Jonathan Chao et al. .... 370/235 |
| 2006/0294311 | A1 * | 12/2006 | Fu et al. ................. 711/118 |
| 2007/0061356 | A1 * | 3/2007 | Zhang et al. ............. 707/102 |
| 2007/0208760 | A1 * | 9/2007 | Reuter et al. ............. 707/100 |
| 2007/0288387 | A1 * | 12/2007 | Park et al. ................ 705/59 |

OTHER PUBLICATIONS

Pei Cao; Bloom Filter—the Math; Jul. 5, 1998; http://pages.cs.wisc.edu/~cao/papers/summary-cache/node8.html.*
Forman et al.; Finding similar files in Large Document Repositories; Aug. 21, 2005 (This reference is provided by applicant).*
Bloom, B. H., "Space/Time Trade-offs in Hash Coding with Allowable Errors", Communication of the ACM, vol. 13, No. 7, Jul. 1970.
Broder, A. et al., "Syntactic Clustering of the Web", SRC Technical Note 1997-015, Jul. 1997.
Eshghi, K. et al., "A Framework for Analyzing and Improving Content-Based Chunking Algorithms", HPL-2005-30, HP Laboratories Palo Alto, Oct. 2005.
Forman, G. et al., "Finding Similar Files in Large Document Repositories", HPL-2005-42, HP Laboratories Palo Alto, Jun. 2005.
Henson, V. et al., "Guidelines for Using Compare-by-Hash", downloaded Sep. 13, 2006.
Manber, U., "Finding Similar Files in a Large File System", TR 93-33, Oct. 1993.
Muthitacharoen, A. et al., "A Low-BandWidth Network File System", downloaded Sep. 13, 2006.

* cited by examiner

*Primary Examiner*—Tony Mahmoudi
*Assistant Examiner*—Md. I Uddin

(57) ABSTRACT

A method for estimating similarity between two collections of information is described herein. The method includes comparing a first Bloom filter representing a first collection of information and a second Bloom filter representing a second collection of information, and determining a measure of similarity between the first collection of information and the second collection of information based on the comparing.

20 Claims, 5 Drawing Sheets

ESTIMATING SIMILARITY BETWEEN TWO COLLECTIONS OF INFORMATION

BACKGROUND

There exist numerous methodologies used in document management systems and search systems for efficient data comparison and efficient data management. A typical data-comparison methodology does not actually determine a degree of similarity between two collections of data, such as two documents, but rather determines whether two documents are identical or "sufficiently identical." Such a methodology typically includes a comparison of the involved documents character by character. There are several problems to this methodology. First, access to an involved document is required each time such document is used in a comparison. Second, the time required to perform the document comparison is necessarily proportional to the length of the longest document. Third, any change to any one of the documents, however minimal, potentially causes the documents to be considered different. There are existing solutions designed to get around the first and third problems.

One way around the first problem is to compute a one-way function of the document. The result is a value that is typically much smaller than the document itself. Thus, the one-way function values of two documents can be compared without the need to access the documents themselves. This enables storage of information needed for comparisons between many documents in a small amount of space and allows mutually-distrusting entities to determine whether they have documents in common without disclosing the content of other documents not in common. However, because the one-way function value is smaller than the document that it represents, it also contains less information, and theoretically many documents can map onto the same one-way function value. If two documents differ in their values for the function, then the documents are confirmed to be different. Whereas, if two documents have the same one-way function value, the best analysis is that the two documents may be identical.

A simple one-way function is a "checksum". A checksum of a document is computed by simply adding up all of the bytes (or words) in the document, ignoring overflow. This is simple to compute but potentially causes accidental collisions, wherein documents that are not identical can have identical checksums. This is because the checksum is insensitive to the order in which the bytes or words occur; that is, it has no notion of context. A better one-way function is a "cryptographic hash." Such a function, if well-designed, has the following properties: (1) any one-bit change to the input results in, on average, half of the bits of the hash changing from zero to one or vice versa, and (2) the bits changed are uniformly distributed. From these two properties, it follows that the hash values of documents are uniformly distributed over the range of the hash function, that it is essentially impossible to determine anything about the content of the document from its hash value, and that for reasonably-sized hash values the probability of two documents accidentally having the same hash value is so small that it can be effectively ignored. With an n-bit hash value, if two documents have the same hash, the probability of this being an accidental collision is about 1 in $2^n$ (two to the nth power). Most cryptographic hashes are at least 128 bits, often larger, which means that it is exceedingly unlikely that any collision is accidental. Common examples of cryptographic hash functions are the Digital Signature Algorithm (DSA), the various Secure Hash Algorithms (SHA, SHA-1, etc.), and the various Message Digest algorithms (MD4, MD5).

One way around the last problem associated with character-to-character comparison is to predefine "differences that make no difference" and normalize the involved documents before (or during) the comparison. In one example, there is a predetermination that line breaks are not important and not to be considered in the document comparison. In another example, there is a predetermination that all white spaces (spaces and tabs) are to be considered equivalent. In still another example, it is predetermined that the document comparison is not to be case-sensitive, that is, case is not important and letters in the involved documents are all converted to lower case (or upper case). Such normalization is possible with the aforementioned techniques for the computation of a one-way function. While normalization is often helpful, it has the drawback that the normalization routine needs to be defined.

As noted above, the conventional character-by-character comparison allows only discovery of documents that are identical.

BRIEF DESCRIPTION OF THE DRAWINGS

Embodiments are illustrated by way of example and not limited in the following figure(s), in which like numerals indicate like elements, in which.

DETAILED DESCRIPTION

Figure 1:
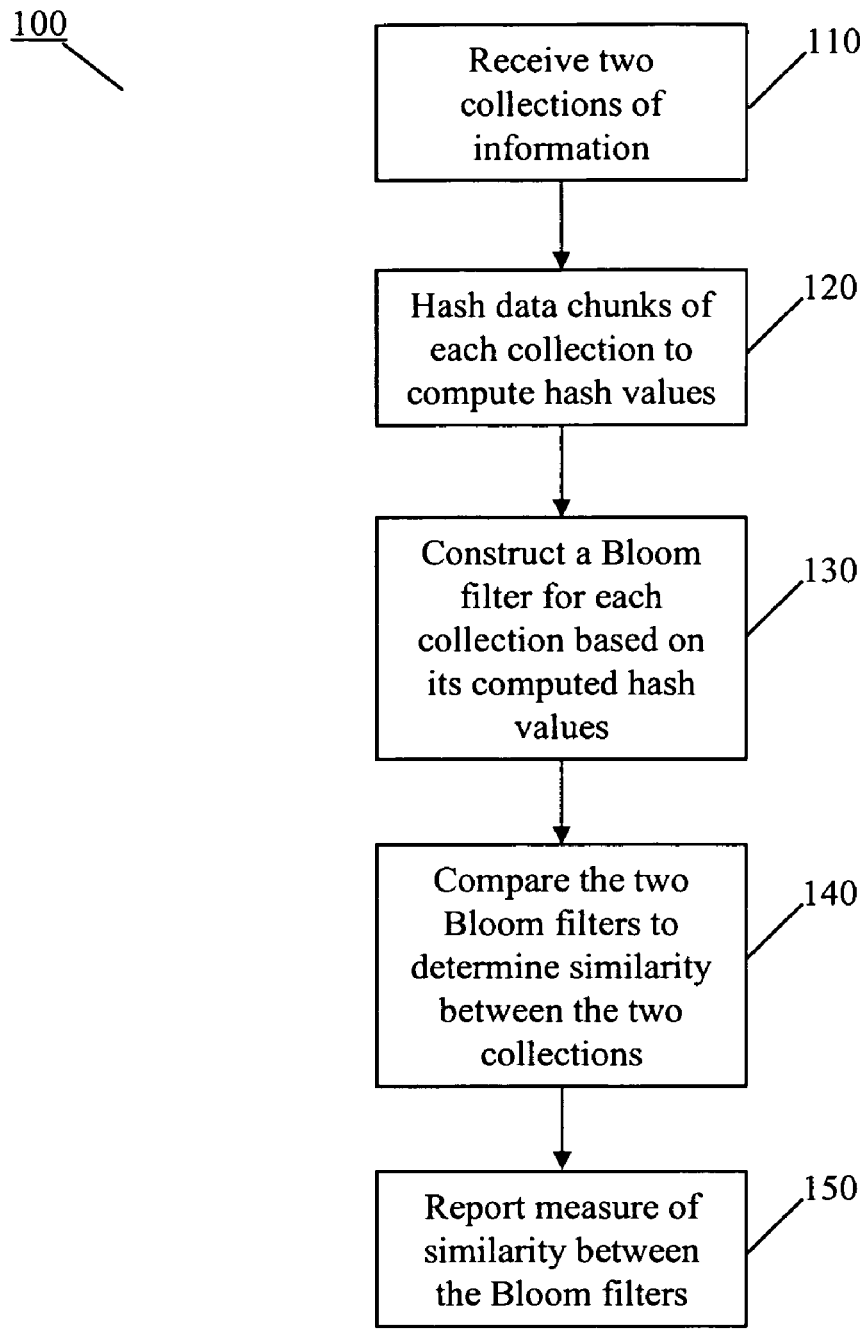
FIG. 1 illustrates a process flow for expressing a degree of similarity between two collections of information, in accordance with one embodiment.

For simplicity and illustrative purposes, the principles of the embodiments are described by referring mainly to examples thereof. In the following description, numerous specific details are set forth in order to provide a thorough understanding of the embodiments. It will be apparent however, to one of ordinary skill in the art, that the embodiments may be practiced without limitation to these specific details. In other instances, well known methods and structures have not been described in detail so as not to unnecessarily obscure the embodiments.

Methods and systems for expressing a degree of similarity between two collections of data or information using Bloom filters for efficient data management are described herein. As described by Burton H. Bloom in "Space/time trade-offs in hash coding with allowable errors," *Communications of the ACM* 13(7), July, 1970, pp. 422-426, and as understood in the art, a Bloom filter is a space-efficient probabilistic data structure that provides a compact representation of a set that is used to test whether a particular hash value is a member of the set, whereby false positives are possible with an arbitrarily-high probability, but false negatives are not possible. As referred herein, a probabilistic data structure is a data structure that, when used for a particular purpose, has at least one associated operation that provides an outcome that is less than certain to be the true outcome. Furthermore, a probabilistic data structure can be deterministic or non-deterministic. The methods and systems described herein are potentially used in data management systems and search engines to set aside or at least identify collections that are duplicates or near duplicates of one another, or that one collection is largely contained in another collection. As referred herein a near duplicate refers to a duplicate but for a small edit or a change in formatting of the data.

As also referred herein, a collection of data or information includes one or more data files, or one or more collection of records, that have been digitized or formatted for electronic storage. Examples of a data file include a textual document or file, a drawing, a chart, a presentation (such as a slide-show), a photographic image, a video image, an audio file, a compiled program, a web page (such as a web page presentation of the results of a database query), a description of the configuration of some system or application, or the like that can be considered as a collection of data segments or chunks (hereinafter, "chunks"), each chunk extractable from the collection. Examples of a collection of records include books in a library, membership records of an organization, e-mail messages in a user's electronic mailbox, photographs in a physical or digital album, TV shows stored on an electronic storage medium (digital video recorder, DVD, computer hard drive, etc.), objects in a room, vehicles observed in a car lot or at an intersection, web pages visited, songs played, files accessed, results of a database query, or the like wherein the records are data elements in the collection. As also referred herein, a data element (hereinafter, "element") is not segmented or chunked. Thus, each data segment, chunk, or element is a unit of data or information in a data collection, whereby such a unit is not further broken down or segmented.

The methods and systems described herein are also useful in identifying data collections that are related to one another because of their derivations from the same source, for example, different versions of the same document, or one document includes portion of another document or both include a portion of a third document. The methods and systems described herein are further operable in a search engine to select documents to present as a result of a search query. As referred herein, a search engine is software, hardware, or a combination of both that searches for data or information based on some criteria.

Advantages of the methods and systems described herein over the prior art include: a lower requirement for storage space than when storing hashes, an ability to break up files into a larger number of smaller chunks to thereby identify more similarity, an ability to tune the process for a tolerable false positive rate as desired, an exposure of less information when communicating hashes, and an ability to determine a similarity between two large (for example, multi-million elements or multi-million broken-up chunks) collections already represented as bloom filters.

Process

The process for expressing a degree of similarity between two collections of data or information (hereinafter, "data collections") using Bloom filters is now described with reference to the process or method flow 100 illustrated in FIG. 1, in accordance with one embodiment. The process, or any part thereof, is potentially employed in any information management system or scheme, information search system or scheme, and initiated by any user wishing to perform information management, information search, or both. For example, users potentially include in-house personnel of an organization wishing to perform information management or information search of information databases within the organization, outside consultants providing information management or information search to an organization or customer, or administrators of a search system, engine, or scheme that performs information searches for other users of such a search system or scheme.

At 110, the two data collections are obtained or received. In one embodiment, a data collection is received at once as a set of elements. For example, an entire listing of the books in a library is received at once as a collection of records. In another embodiment, a data collection is received piecemeal in portions as they become available. For example, an entire listing of the books in a library is received in portions, whereby each portion is received as one or more books are collected or obtained from the library. Thus, one way to receive a data collection is to access or make a query to a database in which the data collection is electronically stored to obtain elements in a data set as they become available therein. The elements are optionally normalized, with any applicable normalization process or routine as further described below.

Alternatively, when the data collection is a single entity, such as a data file, stored in a database, the data collection is retrieved and optionally normalized, with any applicable normalization process or routine, to more efficiently organize the information therein, eliminate redundant data, and remove "differences that make no difference," that is, data in the two collections that is deemed extraneous, not important, or not substantive for consideration in the comparison. For example, as mentioned earlier, line breaks, white spaces, letter case in each collection are not deemed important and not considered in the comparison. Once such a data collection is retrieved, and optionally normalized, it is broken up into multiple chunks or segments of data or information. Any method for segmenting or chunking a collection is applicable here. In the case of a collection of information being received in piecemeal, each portion is operable as a chunk or segment of information or further broken up into multiple chunks or segments as it is received. Although the methods and systems described herein make reference to broken-up data chunks of a single entity, such as a data file, it should be understood that the descriptions are also applicable to elements in a data collection of elements or records. Thus, as described herein, those operations that apply to "chunks" of a data collection can also be applied to "elements" in a data collection, and vice versa. In other words, such operations are applicable to units of information that are not further segmented or broken down.

At 120, a set of hash values is computed for each of the two data collections involved in the comparison. This is accomplished by hashing each chunk of a data collection, by applying a one-way hash function to each chunk, to compute a fixed-size hash value (hereinafter, "hash") for each chunk. Alternatively, if a data collection is a set of data elements (hereinafter, "elements"), each element in the set is hashed to obtain a hash value. Furthermore, prior to being hashed, the elements are optionally normalized, as with the aforementioned optional normalization of a data collection prior to chunking. whereby one a subset of the data available for each element is selected, such as an ISBN number for books in a library or e-mail address for members of an organization. Such a normalization is useful when different data collections potentially have what are considered to be "the same" elements because of unimportant or insignificant differences between them, such as data of acquisition or member number. In one embodiment, the aforementioned one-way hash function is capable of providing a fixed-size hash having at least k m-bits, where k and m are positive integers representing parameters of the hash function. Cryptographic hash functions such as the Digital Signature Algorithm (DSA), the various Secure Hash Algorithms (SHA, SHA-1, etc.), and the various Message Digest functions (MD4, MD5) are applicable here. If a desired hash function does not provide enough bits, multiple hash functions are operable in parallel, either with different parameters or seeding each one with a different constant value, and the resulting hash values are concatenated to provide the desired number of at least km bits.

At 130, a Bloom filter is constructed for each of the two data collections based on its computed hash values, whereby the two Bloom filters are constructed with identical characterization as further described below. It should be understood that the method 100 does not necessarily requires the implementations at 120 and 130 if Bloom filters for the two data collections already exist or are available. In an alternative embodiment, the Bloom filter corresponding to one or both of the two data collections is pre-computed and stored for subsequent use in comparisons involving multiple other data collections. In a further alternative embodiment, the Bloom filters for the data collections are computed by separate entities in order to prevent revelation of the contents of the data collections to entities that do not have permission to learn about them.

At 140, the two Bloom filters are compared to determine a measure of similarity between the two Bloom filters and, thus, a measure of similarity between the two data collections represented by such Bloom filters, as further described below.

At 150, the measure of similarity between the two data collections is reported, for example, to a user for estimating similarity between the two data collections for data comparison, data management, or both.

The construction of a Bloom filter for each of the two data collections (At 130, FIG. 1) is now described with reference to FIG. 2, which illustrates a construction of a Bloom filter from computed hash values. As mentioned earlier, the two Bloom filters have identical characterization. Thus, each Bloom filter is characterized by two parameters: a set of hash functions and a predetermined bit length. These two parameters are chosen based on an expected number of elements in a collection and a desired error rate. Each of the hash functions in the Bloom filter is configured to have a range that matches the bit length of the Bloom filter. Thus, in one embodiment, the Bloom filter includes a set of k hash functions and a length of $2^m$ bits. In other words, the Bloom filter has an array of $M=2^m$ bits, and each of the k hash functions provides an m-bit value (a value from 0 to ($2^m-1$)). In a further, preferred, embodiment, the k hash functions are computed by taking non-overlapping (typically contiguous) sequences of m bits taken from the value produced by a hash function that produces values having at least k·m-bits for each chunk or element in a data collection. Because the larger chunk hash of a data collection is a cryptographic hash and the hashes are uniformly distributed throughout its range, it follows that each of the k m-bit sub-hashes is also a cryptographic hash, albeit one with a larger probability of collision. For example, FIG. 2 illustrates three hash values 210, 220, and 230, each produced by a hash function producing a fixed-length string of 12 bits as output. Each of these hash values is broken up into 3 sub-hashes (k=3), each sub-hash is a contiguous segment having 4 bits (m=4) that provides a value from 0 to 15 ($2^m-1$). Thus, the resulting Bloom filter 250 has an array of $M=2^m=16$ bits set by the values of the k sub-hashes of each of the three hash values 210, 220, and 230. It should be understood that FIG. 2 provides a simple example of a Bloom filter for use in the methods and systems described herein. In practice, the computed hash values for the data collections to be compared can have a higher number of bits, with corresponding Bloom filters with greater bit lengths, such as thousands or millions of bits long. For example, consider a chunk hash that is 256-bit long, which can be broken up into 25 sub-hashes, each 10-bit long, where k=25 and m=10 (with six bits remaining and ignored). Thus, each 10-bit sub-hash has a value ranging from 0 to ($2^m-1$), or 0-1,023, and the Bloom filter is an array of $M=2^m=1,024$ bits.

Accordingly, the chunk hashes of each data collection are entered into a respective Bloom filter by entering the sub-hashes of each chunk into the Bloom filter. Each of the m-bit sub-hashes of a chunk is treated as an index into the bits of the Bloom filter, and the bits addressed by each of the k indices is set to one, wherein the k indices need not all be distinct from one sub-hash to another, or from one chunk hash to another. The following computations are illustrated to show entries of the k sub-hashes of each chunk into a Bloom filter.

In the following computations, $Z_n^{(s)}$ represents the expected number of unset ("zero") bits in a Bloom filter after n bits are added, if s bits were unset initially. Accordingly, $$Z_0^{(s)} = s$$

When n bits are added to the Bloom filter, for example, when sub-hashes of the hashes corresponding to an element or set of elements are added to the Bloom filter, the value can be derived by induction to be $$Z_{n+1}^{(s)} = Z_n^{(s)} - \frac{Z_n^{(s)}}{M} = Z_n^{(s)} \left(\frac{M-1}{M}\right)$$

because when the next ($n+1^{st}$) bit is added, it has a chance of $Z_n^{(s)}/M$ of mapping onto a bit that is currently zero and therefore reducing the number by one. This simplifies algebraically to $$Z_{n+1}^{(s)} = s\left(\frac{M-1}{M}\right)^{n+1}$$

If we start with an initially empty Bloom filter, s=M. Thus, if $Z_n$ is the expected number of unset bits in a Bloom filter after n hashes have been added, $$Z_n = Z_n^{(M)} = M\left(\frac{M-1}{M}\right)^n$$

On the other hand, the number of bits set ("one") expected after adding n bits is:

$$U_n = M - Z_n = M - M\left(\frac{M-1}{M}\right)^n = M\left(1 - \left(\frac{M-1}{M}\right)^n\right).$$

Thus, the probability of an accidental collision with a single bit in a (k, m)-Bloom filter representing a set containing N elements is:

$$\frac{U_{Nk}}{M} = 1 - \left(\frac{M-1}{M}\right)^{Nk}.$$

since N elements will be represented by Nk bits (k per element) added to the Bloom filter, and the probability of all k bits representing a single element being collisions (and therefore resulting in a false positive) is:

$$\left(1 - \left(\frac{M-1}{M}\right)^{Nk}\right)^k.$$

This value is the expected false positive rate (FPR) for a (k, m)-Bloom filter containing N elements, where $M=2^m$. Given this equation, it is straightforward to compute a table that allows one to choose appropriate values of k and m given an expected number of entries, a base hash size, and a tolerable false positive rate. An example of such a table, with a base hash size of 256 bits, is shown in Table 1. Each column in this table represents a tolerable false positive rate and each row represents a combination of k and m that can be made from a 256-bit hash. The entries in the table are the maximum number of elements (or chunks) that can be expected to be stored in a Bloom filter characterized by the row without expecting to exceed the false positive rate given by the column.

and expends 32 KB, while the alternative of storing a list of hashes requires, on average, about 16 KB.

Figure 3:
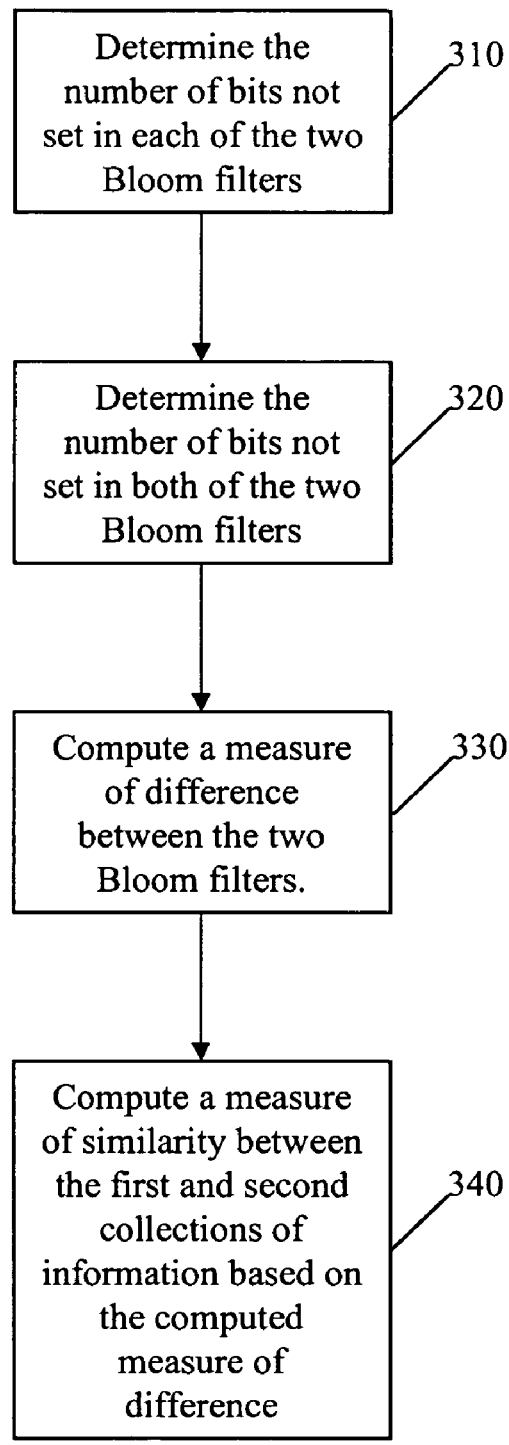
FIG. 3 illustrates a process flow for a determination of similarity between two Bloom filters, in accordance with one embodiment.

The determination of a similarity between the two Bloom filters (at 140, FIG. 1) is now described. Due to the nature of the Bloom filter, as noted earlier, to determine whether a hash value of a collection element is in a constructed Bloom filter, and therefore the element is in the set the Bloom filter represents, the hash value is used to derive k m-bit hash values to be used as indices of bits within the Bloom filter, and the Bloom filter is checked to see whether all k bits in the Bloom filter are set (have "one" values). If not all k bits are set, then the hash value certainly does not represent an element in the set, that is, the hash value is not represented in the Bloom filter. Otherwise, the element is probably in the set, but it is possible that all of the k bits accidentally collide with a bit from a hash value of one or more other elements in the set. FIG. 3 illustrates further details of the determination of the similarity between the two Bloom filters.

Referring to FIG. 3, at 310, the number of bits not set in each of the two Bloom filters are determined. In one embodiment, this operation is performed by looking up each multi-

TABLE 1

| # hashes (k) | bits/ hash (m) | Bloom filter size | | Maximum False Positive Rate (FPR) | | | |
|---|---|---|---|---|---|---|---|
| | | | 0.01 | 0.001 | 0.0001 | 0.00001 | 0.000001 |
| 8 | 32 | 512 MB | 443,624,999 | 294,020,827 | 204,080,958 | 145,318,771 | 105,122,324 |
| 8 | 31 | 256 MB | 221,812,499 | 147,010,413 | 102,040,479 | 72,659,385 | 52,561,162 |
| 8 | 30 | 128 MB | 110,906,249 | 73,505,206 | 51,020,239 | 36,329,692 | 26,280,581 |
| 8 | 29 | 64 MB | 55,453,124 | 36,752,603 | 25,510,119 | 18,164,846 | 13,140,919 |
| 9 | 28 | 32 MB | 27,291,003 | 18,609,066 | 13,282,214 | 9,725,854 | 7,236,919 |
| 9 | 27 | 16 MB | 13,645,501 | 9,304,533 | 6,641,107 | 4,862,927 | 3,618,459 |
| 9 | 26 | 8 MB | 6,822,750 | 4,652,266 | 3,220,553 | 2,431,463 | 1,809,229 |
| 10 | 25 | 4 MB | 3,344,850 | 2,333,792 | 1,703,477 | 1,275,505 | 970,622 |
| 10 | 24 | 2 MB | 1,672,425 | 1,166,896 | 851,738 | 637,752 | 485,311 |
| 11 | 23 | 1 MB | 818,079 | 581,758 | 432,529 | 329,829 | 255,622 |
| 12 | 21 | 256 KB | 199,837 | 144,409 | 109,037 | 84,424 | 66,432 |
| 12 | 20 | 128 KB | 99,918 | 72,204 | 54,518 | 42,212 | 33,216 |
| 13 | 19 | 64 KB | 48,785 | 35,742 | 27,347 | 21,448 | 17,095 |
| 14 | 18 | 32 KB | 23,814 | 17,657 | 13,663 | 10,036 | 8,733 |
| 15 | 17 | 16 KB | 11,625 | 8,710 | 6,807 | 5,451 | 4,436 |
| 16 | 16 | 8 KB | 5,676 | 4,292 | 3,384 | 2,733 | 2,243 |
| 17 | 15 | 4 KB | 2,772 | 2,114 | 1,679 | 1,367 | 1,130 |
| 18 | 14 | 2 KB | 1,354 | 1,040 | 832 | 682 | 567 |
| 19 | 13 | 1 KB | 662 | 512 | 412 | 240 | 284 |
| 21 | 12 | 512 B | 316 | 248 | 201 | 168 | 142 |
| 23 | 11 | 256 B | 151 | 120 | 98 | 82 | 70 |
| 25 | 10 | 128 B | 72 | 58 | 48 | 40 | 35 |
| 28 | 9 | 64 B | 34 | 27 | 23 | 19 | 17 |

Because the interest herein is with estimating the size of the overlap between two collections rather than with checking membership (that is, being relatively certain that any specific element is or is not in the set), it is possible to tolerate a relatively large false positive rate, say one in a thousand. Whereas, if the interest is in membership, a false positive rate of one in a million or less is potentially desired or required.

Accordingly, if on average there are, for example, 500 elements in a collection and a fair number of collections contain up to 1000, an (18,14)-Bloom filter is potentially chosen, which takes up approximately 2 KB of memory and provides a 1/1,000,000 FPR in most cases and rarely worse than a 1/1000 FPR, as illustrated in Table 1. The alternative of representing a collection by storing a 128-bit chunk hash for each element takes, on average, about 6 KB. If an average size of a collection is 1000 elements, but a non-trivial number gets up to 10,000, it is possible to choose a (14,18)-Bloom filter bit byte or word in each Bloom filter array and counting the number of zeros ("0") in the array.

Figure 4:
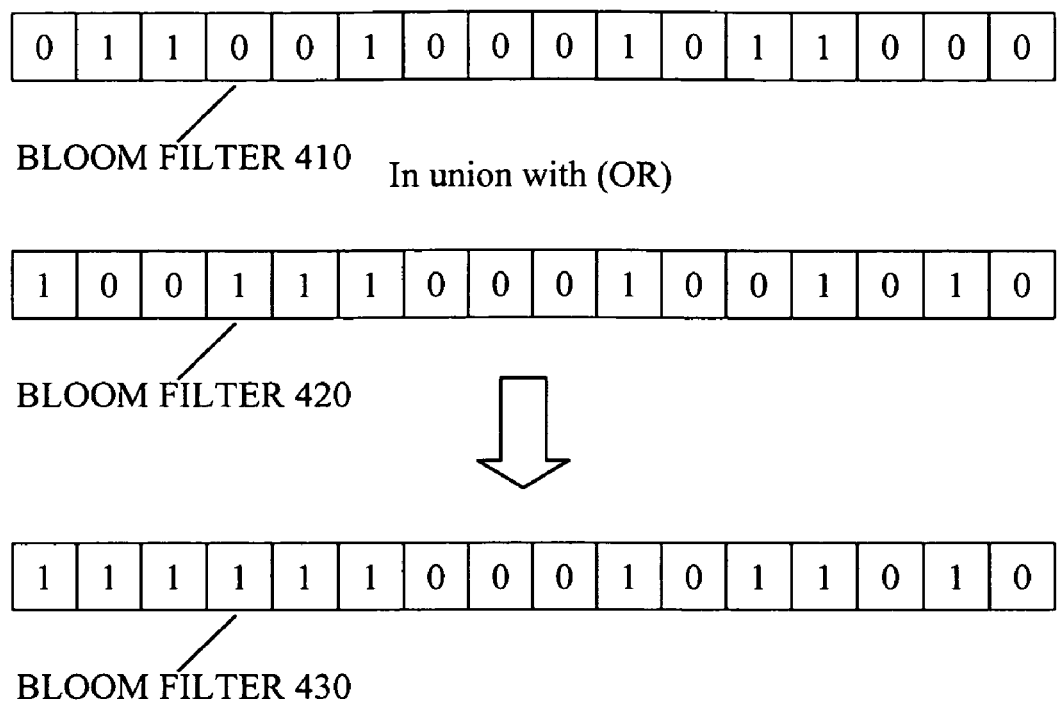
FIG. 4 illustrates a determination of a union of bits in Bloom filters, in accordance with one embodiment.

At 320, the number of bits not set in either of the two filters are determined. This operation is operable at the same time as the operation at 310 by using the bitwise OR of the arrays from the two Bloom filters. This is equivalent to determining the number of bits that would not have been set in a similarly-characterized Bloom filter 430 representing a collection containing the union of the two collections, which are represented by the two Bloom filters 410 and 420, as illustrated in FIG. 4. In an alternative embodiment, the numbers of bits not set in each of the two Bloom filters are determined when the Bloom filters are constructed. In such an embodiment, each count is initialized to M before any hash values are added. Then when the bits addressed by each of the k bits corresponding to a chunk in each data collection (or element in each set) are set in the Bloom filter corresponding to the appropriate collection, if an addressed bit had previously been unset (had a "zero" value) it is changed to be set (have a "one" value) and the count corresponding to the Bloom filter is decremented. In an extension of this embodiment, a third Bloom filter representing the union of the two collections is also constructed and a similar counter is decremented to determine the count of bits not set in either of the two original filters, the hash values for elements in each of the two collections being used to set bits in the third Bloom filter.

At 330, the system computes the ratio of the natural logs of (1) the ratio of the number of zeros in a first Bloom filter (determined at 310) and the number of zeros from the combined Bloom filters (determined at 320) and (2) the ratio of the number of bits in the first (or second) filter (M) and the number of zeros in the second Bloom filter. Such a computation provides a measure of difference between the two Bloom filters and the two sets represented therein. Specifically, the above computation provides an estimate of the fraction of the second set that does not appear in the first set. Swapping the two sets allows a further computation of the difference measure going the other way. Furthermore, if the size of the second set (as found in the second Bloom filter) is known, the difference measure is the ratio of (1) M times the numerator of the above computation and (2) k times the size of the second set.

At 340, the system computes a measure of similarity between the first and second collections of information by subtracting the difference measure computed at 330 from a value of one ("1"). The following computations are illustrated to support the process flow in FIG. 3.

From the definition of Z as described earlier, the system is operable to compute the number of bits that are probably inserted into a Bloom filter (because of possible collisions), given an initial and final number of zeros, as $$Z_n^{(s)} = s\left(\frac{M-1}{M}\right)^n \frac{Z_n^{(s)}}{s} = \left(\frac{M-1}{M}\right)^n$$

Thus, $$n = \log_{\frac{M-1}{M}} \frac{Z_n^{(s)}}{s}$$

$$= \frac{\log \frac{Z_n^{(s)}}{s}}{\log \frac{M-1}{M}}$$

$$= \frac{\log Z_n^{(s)} - \log s}{\log(M-1) - \log M}.$$

Because for sufficiently large M, $$e \approx \left(\frac{M}{M-1}\right)^M$$

$$e^{\frac{1}{m}} \approx \frac{M}{M-1}$$

$$\frac{1}{M} \approx \log \frac{M}{M-1},$$

where e is the constant, 2.718 . . . , that forms the base of the natural logarithms. Therefore, n can be approximated as, $$n = \frac{\log s - \log Z_n^{(s)}}{\log M - \log(M-1)} \approx M(\log s - \log Z_n^{(s)})$$

The two collections for comparison are represented as sets A and B, each with its own Bloom filter. Also C=A−B is the set of elements (or chunks) that are in A but not in B. It is clear that all bits set in the Bloom filter image of A that are not in the Bloom filter image of B necessarily have been set based on the insertion of hash values corresponding to elements of C. A step in computing the similarity of sets A and B is to estimate |C|, that is, the size of C.

If $z_B$ is the number of unset bits in B, as obtained at 310 in FIG. 3, and $z_{AB}$ is the number of unset bits in either A and B (equivalently, the number of bits not set in the OR of A and B, or the number of bits not set in a Bloom filter corresponding to the union of sets A and B), as obtained at 320 in FIG. 3, then, $$z_{AB} \approx Z_{k|C|}^{(z_B)} = z_B\left(\frac{M-1}{M}\right)^{k|C|}.$$

Thus, $$z_{AB} = z_B\left(\frac{M-1}{M}\right)^{k|C|}$$

$$\left(\frac{M}{M-1}\right)^{k|C|} = \frac{z_B}{z_{AB}}$$

$$k|C|\log \frac{M}{M-1} = \log \frac{z_B}{z_{AB}}$$

$$\frac{k|C|}{M} = (\log z_B - \log z_{AB})$$

$$k|C| = M(\log z_B - \log z_{AB})$$

$$|C| = \frac{M}{k}(\log z_B - \log z_{AB})$$

because $z_{AB}$ bits is expected to be left unset if the comparison were started with B's filter (which has $z_B$ bits unset), and bits for all of the elements in C were subsequently added. Because the problem is symmetric, it is possible to replace B with A in the above equation to get:

$$|D = B - A| = \frac{M}{k}(\log z_A - \log z_{AB}).$$

which represents those elements or chunks that are in B but not in A.

Examples are now provided to illustrate the above computations. In the following examples, a (18, 14)-Bloom filter is assumed, with k=18 and $M=2^m=2^{14}=16{,}384$ bits. Thus, $$\frac{M}{k} \approx 910.2.$$

In a first example, B's filter has 5,000 bits set, A's filter has 3,000 bits set, and A's filter has 100 bits set that are not set in B's filter. Thus, A's filter has 11,384 unset bits, B's filter has 13,384 unset bits, and the union of the two filters has 11,284 unset bits. Accordingly, $$|C = A - B| = 910.2[\log(16{,}384 - 5{,}000) - \log(16{,}384 - 5{,}000 - 100)]$$
$$= 910.2[\log 11{,}384 - \log 11{,}284]$$
$$\approx 8.0.$$

Thus, it is estimated that there are approximately 8 elements that are in A but not in B. Going the other direction, $$|D = B - A| = 910.2[\log(16{,}384 - 3000) - \log(16{,}384 - 5{,}000 - 100))$$
$$|D| = 910.2[\log 13{,}384 - \log 11{,}284]$$
$$\approx 155.3.$$

Thus, it is estimated that there are approximately 155 elements that are in B but not in A.

In a second example, B's filter has 5000 bits set, and A's filter has 1000 bits set that are not set in B's filter. Thus, $$|C| = 910.2(\log 11{,}384 - \log 10{,}284)$$
$$\approx 83.7.$$

Thus, it is estimated that there are approximately 84 elements that are in A but not in B.

In a third example, B's filter has 4000 bits set and A's filter has 1000 bits set that are not set in B's filter. Thus, $$|C| = 910.2(\log 12{,}384 - \log 11{,}284)$$
$$\approx 76.6.$$

Thus, it is estimated that there are approximately 77 elements that are in A but not in B. The number in the third example is smaller than in the second example because each element in A has less of a chance of accidentally colliding with a bit produced by an element of B, and so we'd expect a greater fraction of the bits to wind up in the complement.

Now, the calculated size of C, or $|C|$, is used to estimate the number of elements of A that are also in B. The size of the intersection of A and B is determined by, $$|A \cap B| = |A| - |C|$$

In one embodiment, the size of A (or $|A|$) is provided. However, if $|A|$ is not provided, it is possible to estimate it as, $$z_A = Z_{k|A|}^{(M)}$$
$$= M\left(\frac{M-1}{M}\right)^{k|C|}$$
$$k|A| = M(\log M - \log z_A)$$

-continued
$$|A| = \frac{M}{k}(\log M - \log z_A).$$

The fraction of A also contained in B, then becomes, $$\frac{|A \cap B|}{|A|} = \frac{|A| - |C|}{|A|}$$
$$= 1 - \frac{|C|}{|A|}$$
$$= 1 - \frac{\log z_B - \log z_{AB}}{\log M - \log z_A}.$$

As discussed earlier, the ratio $$\frac{|C|}{|A|}$$

provides a measure of difference between the two Bloom filters, and therefore the two sets A and B. In other words, it is the ratio of the natural logs of (1) the ratio of the number of zeros in a first Bloom filter and the number of zeros from the combined Bloom filters, or $\log(z_B/z_{AB})=\log z_B - \log z_{AB}$, and (2) the ratio of the number of bits in the first filter (M) and the number of zeros in the second Bloom filter, or $\log(M/z_A)=\log M - \log z_A$.

For the above three examples, where A's filter has 3000 bits set, $|A|$ is estimated as, $$|A| = 910.2(\log 16{,}384 - \log 13{,}284)$$
$$\approx 184.1$$

For the first example, $$\frac{|A \cap B|}{|A|} = 1 - \frac{|C|}{|A|}$$
$$= 1 - \frac{8}{184.1}$$
$$= 0.957.$$

or, alternatively, $$\frac{|A \cap B|}{|A|} = 1 - \frac{\log 11{,}386 - \log 11{,}284}{\log 16{,}384 - \log 13{,}384}$$
$$= 0.956.$$

By either estimate, the result is that about 96% of the elements in A are also in B. As discussed earlier, because the problem is symmetric, it is possible to estimate the size of B, that is, $|B|$, to be, $$|B| = 910.2(\log 16{,}384 - \log 11{,}384)$$
$$= 331.4.$$

The fraction of B that is contained in A then becomes, $$\frac{|A \cap B|}{|B|} = 1 - \frac{\log z_G - \log z_{AB}}{\log M - \log z_B}$$
$$= 1 - \frac{\log 13{,}386 - \log 11{,}284}{\log 16{,}384 - \log 11{,}384}$$
$$= 0.531.$$

Thus, while about 96% of about 184 elements of A are also in B, only about 53% of about 331 elements of B are also in A. The first estimate that the overlap contains 177.7 elements, while the second implies that it contains 175.8.

If the actual sizes of A and B are know to be, for example, 180 and 325, then the size of C becomes, $$|C| = 910.2(\log 11{,}384 - \log 11{,}284)$$
$$= 8.$$

The intersection of A and B then becomes, $$|A \cap B| = |A| - |C|$$
$$= 180 - 8$$
$$= 172.$$

And the fraction of A that is contained in B becomes, $$\frac{|A \cap B|}{|A|} = \frac{172}{180} = 0.956,$$

and the fraction of B that is contained in A becomes, $$\frac{|A \cap B|}{|B|} = \frac{172}{325} = 0.529.$$

Again, because the problem is symmetric, it is possible to compute the other way, with D=B−A, as, $$|D| = 910.2(\log 13{,}384 - \log 11{,}284)$$
$$= 155.3$$
$$|A \cap B| = |B| - |D|$$
$$= 325 - 155.3$$
$$= 169.7$$

-continued $$\frac{|A \cap B|}{|A|} = \frac{169.7}{180} = 0.943,$$
$$\frac{|A \cap B|}{|B|} = \frac{169.7}{325} = 0.522.$$

In one embodiment, performing the computations both ways provides a range on the estimate. In another embodiment, the both-way computations are averaged to provide the estimate. In still another embodiment, the projection onto the smaller set (A in the above example) provide an exemplary estimate, as there is "more room" for the extra bits of the complement (in this case, D) to go. Thus, 172 is chosen as an estimate for the overlap over 169.7. Regardless, any of the above estimates indicates that A is largely contained in B, while only about half of B is contained in A.

In one embodiment for implementation, for example, in a search engine, a search query is initially received by the search engine. Next, the search engine performs a search based on any known searching algorithms to retrieve one or more search results, such as a plurality of documents, that are related to the search query. The method 100 in FIG. 1 is then operable to be performed on the retrieved search results. If two documents from the search results are candidates for presentation as the result of a search query, and one is largely contained in the other based on a predetermined threshold (for example, if one has 90% contained in the other), there is no need to present both. In most cases, it will be better to present the containing document (although there may be reasons to present the other). If two documents each contains most of the other, than they are probably nearly identical documents and other information (such as modification date) are potentially used to select one of them.

In another embodiment for implementation by a search engine, a user is able to input a data collection, such as a document, to the search engine as a search query. Next, the search engine performs a preliminary search based on any know searching algorithms to retrieve a preliminary set of search results, such as a plurality of documents, that are related to the search query. The method 100 in FIG. 1 is then operable to be performed on both the search query and the search results, whereby a Bloom filter is constructed for the search query and each of the search results so that the Bloom filter for the search query can be compared with the Bloom filter for each of the search results for similarity so that the search results can be ranked by the degree of similarity between the Bloom filter for the search query and the Bloom filter for each search result.

Figure 2:
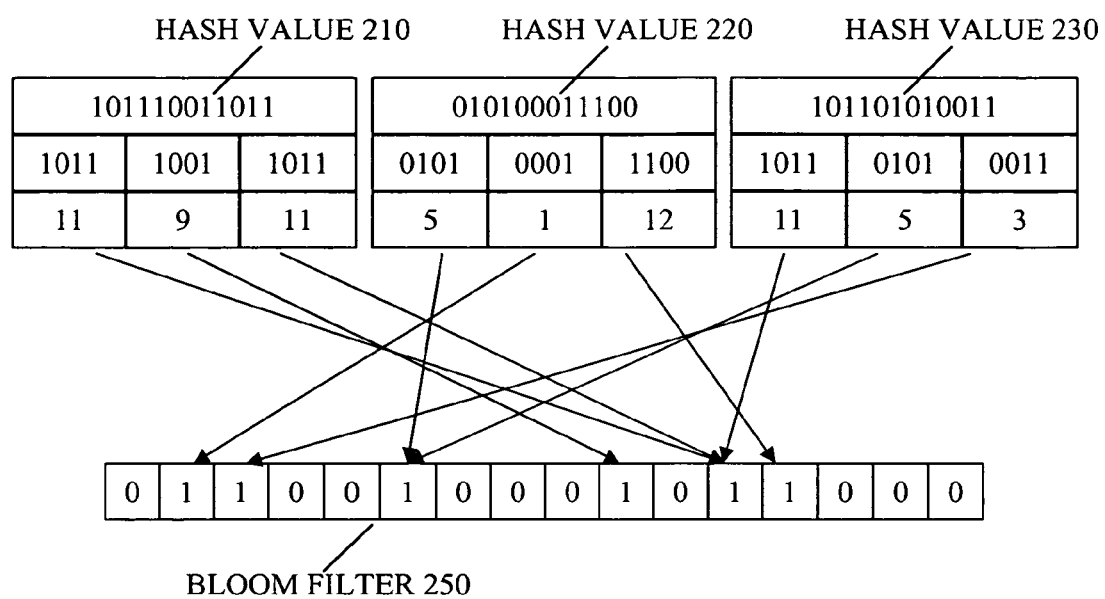
FIG. 2 illustrates a construction of a Bloom filter, in accordance with one embodiment.

In an alternative embodiment, the search engine can employ the method 100 in FIG. 1 as the searching algorithm for retrieving search results for the search query. The search engine is operable to construct a Bloom filter for each element or chunk of information that it comes across so as to compare such a Bloom filter to the Bloom filter for the search query. To do so, the search engine can construct Bloom filters on the fly, that is, dynamically in real time as the search engine performs searches based on the search query. Alternatively, the search engine is operable to preemptively construct Bloom filters for information from various sources and cache the Bloom filters in one or more databases. Thus, when a search query is received, the search engine can construct a Bloom filter for the search query and compare it against the cached Bloom filters to obtain the search results.

System

Figure 5:
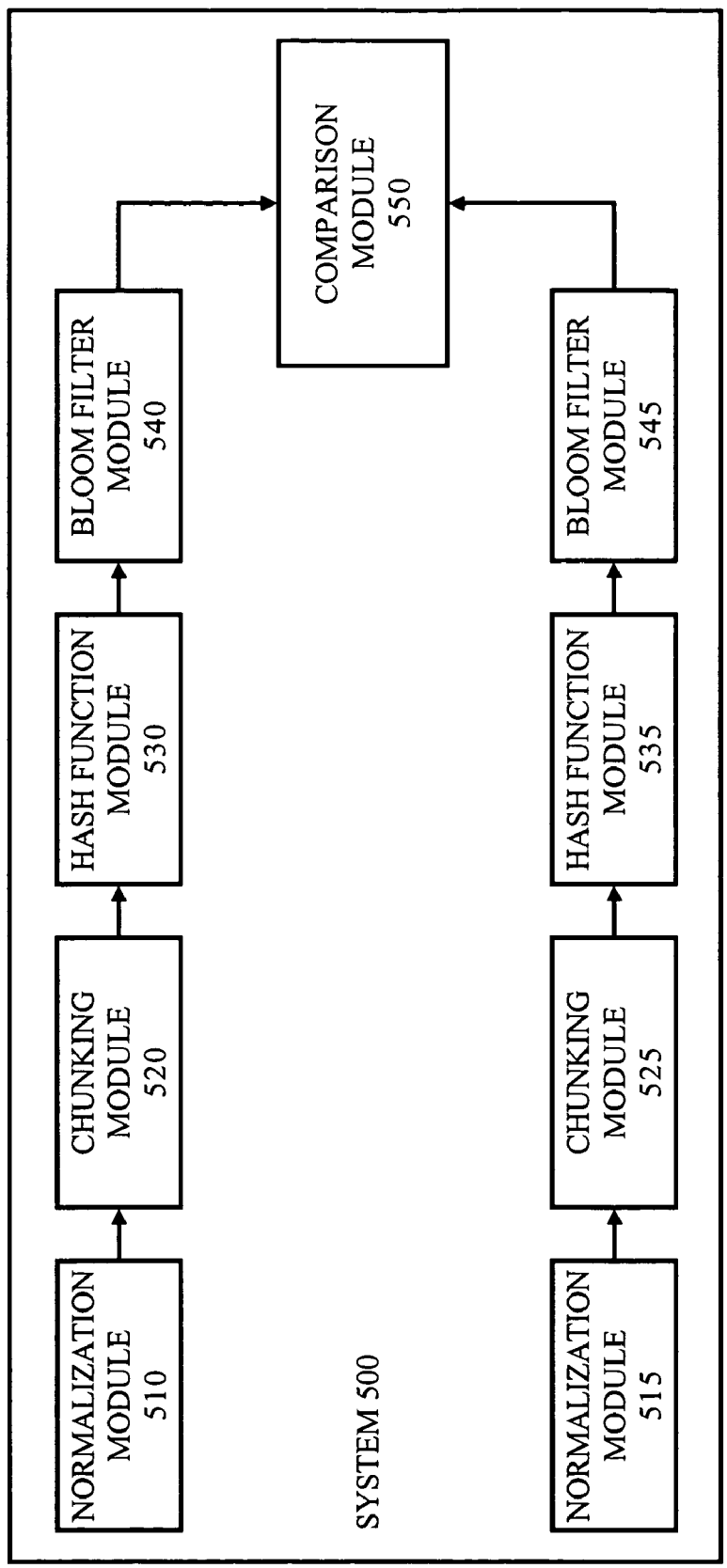
FIG. 5 illustrates a system in which the process flows shown in FIGS. 1-4 are applicable, in accordance with one embodiment.

One or more of the steps in the method 100 and other steps described herein are potentially implemented in various systems. FIG. 5 illustrates an exemplary system 500 in which the aforementioned steps are operable. The system 500 includes a first normalization module 510, a first chunking module 520, a first hash function module 530, a first Bloom filter module 540, a second normalization module 515, a second chunking module 525, and second hash function module 535, a second Bloom filter module 545, and a comparison module 550.

The first normalization module 510 is operable to normalize the first collection of information as received by the system 500. Likewise, the second normalization module 515 is operable to normalize the second collection of information as received by the system 500. Thus, the first and second normalization modules 510 and 515 are operable to perform the method 100 at 120.

The first chunking module 520 is operable to segment or break up the normalized first collection of information as output by the first normalization module 510 into multiple chunks or segments. Likewise, the second chunking module 525 is operable to segment or break up the normalized second collection of information as output by the second normalization module 515 into multiple chunks or segments. Thus, the first and second chunking modules 520 and 525 are operable to perform the method 100 at 130. It should be understood that the first and second chunking modules 520 and 525 are potentially not employed if each collection of information is already represented by data elements that are not segmented or chunked.

The first hash function module 530 is operable to apply a hash function to each of the chunks from the first collection of information as output by the first chunking module 520 to generate a hash value for each chunk. Likewise, the second hash function module 535 is operable to apply a hash function to each of the chunks from the second collection of information as output by the second chunking module 525 to generate a hash value for each chunk. Thus, the first and second hash function modules 530 and 535 are operable to perform the method 100 at 140.

The first Bloom filter 540 is operable to be filled with hash values for the chunks from the first collection of information as output by the first hash function module 530. Likewise, the second Bloom filter 545 is operable to be filled with hash values for the chunks from the second collection of information as output by the second hash function module 535. Thus, the first and second Bloom filters are operable to perform the method 100 at 150.

The comparison module 550 is operable to compare the first Bloom filter 540 and the second Bloom filter 545 to determine a similarity between the first and second collections of information. Thus, the comparison module 550 is operable to perform the method 100 at 160.

In one embodiment, each of the modules in FIG. 5 is potentially implemented by one or more software programs, applications, or modules having computer-executable programs that include code from any suitable computer-programming language, such as C, C++, C##, Java, or the like. Furthermore, the system 500 is potentially implemented by a computerized system, which includes a computer or a network of computers. Examples of a computerized system include but are not limited to one or more desktop computers, one or more laptop computers, one or more mainframe computers, one or more networked computers, one or more processor-based devices, or any similar types of systems and devices. Thus, the computerized system includes one or more processors of any of a number of computer processors, such as processors from Intel, Motorola, AMD, Cyrix. Each processor is coupled to or includes at least one memory device, such as a computer readable medium (CRM). The processor is operable to execute computer-executable programs instructions stored in the CRM, such as the computer-executable programs to implement one or more modules in the system 500. Embodiments of a CRM include, but are not limited to, an electronic, optical, magnetic, or other storage or transmission device capable of providing a processor of the server with computer-readable instructions. Other examples of a suitable CRM include, but are not limited to, a floppy disk, CD-ROM, DVD, magnetic disk, memory chip, ROM, RAM, an ASIC, a configured processor, any optical medium, any magnetic tape or any other magnetic medium, or any other medium from which a computer processor is operable read instructions.

Alternative embodiments are contemplated wherein each of the modules in the system 500 is potentially implemented in a separate computerized system, or wherein multiple modules are implemented in a single module. For example, the first and second normalization modules 510 and 515 are potentially implemented as a single normalization module, the first and second chunking module 520 and 525 are potentially implemented as a single chunking module, the first and second hash function modules 530 and 535 are potentially implemented as a single hash function module, and the first and second Bloom filter modules 540 and 545 are potentially implemented as a single Bloom filter module that is capable of generating two different Bloom filters for the two collections of information. In other examples, it is possible to combine any module in the system 500 with one or more other modules therein, so long as the resulting combined module is operable to perform all the functions of those modules that have been combined.

What has been described and illustrated herein are embodiments along with some of their variations. The terms, descriptions and figures used herein are set forth by way of illustration only and are not meant as limitations. Those skilled in the art will recognize that many variations are possible within the spirit and scope of the subject matter, which is intended to be defined by the following claims—and their equivalents—in which all terms are meant in their broadest reasonable sense unless otherwise indicated.

What is claimed is:

1. A method for estimating similarity between two collections of information, comprising:

receiving a first collection of information and a second collection of information;

hashing data chunks of the first and second collections using a set of hash functions;

deriving k m-bit hash values from hash values determined from the hashing of the first collection of information, where k>1 and m>1;

determining an index for each of the k m-bit hash values;

using a computer processor and the indices for the k m-bit hash values to compare a first probabilistic data structure representing a first collection of information and a second probabilistic data structure representing a second collection of information;

using a computer processor to determine a measure of similarity between the first probabilistic data structure and the second probabilistic data structure based on the comparing; and estimating similarity between the two collections of information from the determined measure of similarity for one of efficient data comparison and efficient data management of the two collections of information.

2. The method of claim 1, wherein the first collection of information includes at least one data element, and the method further comprising:
applying a hash function to the at least one data element in the first collection of information to obtain a hash value.

3. The method of claim 2, further comprising:
normalizing information in the at least one data element.

4. The method of claim 2, wherein the first probabilistic data structure is a first Bloom filter that includes a bit length having a predetermined number of bits, and the method further comprising:
determining from the hash value a plurality of indices to the bits in the first Bloom filter; and
ensuring that the indexed bits in the first Bloom filter are all set to a first bit value.

5. The method of claim 1, wherein the comparing the first probabilistic data structure and the second probabilistic data structure comprises:
determining a first number of bits in the second probabilistic data structure that are set to a predetermined bit value;
providing a third probabilistic data structure representing a union of the first probabilistic data structure and the second probabilistic data structure;
determining a second number of bits in the third probabilistic data structure that are set to the predetermined bit value;
computing a logarithm of a ratio of the first number of bits and the second number of bits; and
determining, based on the computed logarithm, a first estimate of an amount of information in the first collection of information that is not contained in the second collection of information.

6. The method of claim 5, wherein:
the comparing the first probabilistic data structure and the second probabilistic data structure further comprises determining a second estimate of a size of the first collection of information; and
the determining the measure of similarity further comprises computing the measure of similarity between the first collection of information and the second collection of information based on both the first estimate and the second estimate.

7. The method of claim 6, wherein the first probabilistic data structure is a first Bloom filter and the second probabilistic data structure is a second Bloom filter, and the determining the second estimate of the size of the first collection further comprises:
computing a logarithm of a ratio of a total number of bits in the first Bloom filter and a number of bits in the first Bloom filter that are set to the predetermined bit value.

8. The method of claim 1, wherein the first collection of information includes one of:
books in a library;
membership records of an organization;
e-mail messages in an electronic mailbox;
photographs in an album;
TV shows stored in an electronic storage medium;
objects in a room;
vehicles observed at a location;
web pages visited;
songs played;
files accessed;
results of a database inquiry; and
extractable chunks of information from one of,
a textual document or file, a drawing, a chart, a presentation, a photographic image, a video image, an audio file, a compiled program, a web page, and a description of a configuration of a system or application.

9. A computerized method for efficiently providing an information service to a customer, comprising:
constructing a first plurality of chunks of information based on a first collection of information; and
constructing a second plurality of chunks of information based on a second collection of information for comparison with the first collection of information;
hashing the plurality of chunks of information of the first and second collections using a set of hash functions;
deriving k m-bit hash values from hash values determined from the hashing of the first collection of information, where k>1 and m>1;
determining an index for each of the k m-bit hash values;
constructing a first probabilistic data structure based on the first plurality of chunks of information;
constructing a second probabilistic data structure based on the second plurality of chunks of information; and
comparing in a computerized system, using the indices for the k m-bit hash values, the first probabilistic data structure and the second probabilistic data structure; and
determining in the computerized system a measure of similarity between the first probabilistic data structure and the second probabilistic data structure based on the comparing;
estimating similarity between the first collection of information and the second collection of information based on the determined measure of similarity as part of efficiently providing the information service to the customer.

10. The method of claim 1, wherein the first collection of information includes a document representing one of a textual document, a photographic image, a video image, a drawing, an audio file, a chart, a configuration description, a presentation, a web page, and a compiled program.

11. The method of claim 10, wherein the constructing a first plurality of chunks comprises determining a first boundary of one of the plurality of chunks within the first document by one of:
noting a predetermined distance of the first boundary from a prior boundary;
searching for a predetermined character sequence;
searching for a match to a predetermined regular expression; and
computing a function over the contents of a sliding window within the first document.

12. The method of claim 9, wherein the first probabilistic data structure is a first Bloom filter, the second probabilistic data structure is a second Bloom filter, and the first collection of information comprises a search query received from the customer.

13. The method of claim 9, wherein the first collection of information and the second collection of information are received from the customer.

14. The method of claim 10, wherein the second collection of information comprises a second document constructed from the second plurality of chunks of information, and the first document and the second document are contained within a result returned in response to a search query, and wherein a determination is made to not present the second document based on the measure of similarity.

15. The method of claim 10, wherein the second collection of information comprises a second document constructed from the second plurality of chunks of information, and the method further comprising:
   determining that the first document is largely contained within the second document based on the measure of similarity.

16. A computer readable storage device on which is stored program code for measuring similarity between two collections of information, the encoded program code comprising:
   program code for receiving a first collection of information and second collection of information;
   program code for hashing data chunks of the first and second collections using a set of hash functions;
   program code for deriving k m-bit hash values from hash values determined from the hashing of the first collection of information, where k>1 and m>1;
   program code for determining an index for each of the k m-bit hash values;
   program code for comparing, using the indices for the k m-bit hash values, a first probabilistic data structure representing a first collection of information and a second probabilistic data structure representing a second collection of information; and
   program code for determining a measure of similarity between the first collection of information and the second collection of information based on the program code for comparing.

17. The computer readable storage device of claim 16, wherein the encoded program code further comprising:
   program code for generating the first probabilistic data structure based on the hash values for the first collection of information.

18. The computer readable storage device of claim 16, wherein the encoded program code further comprising:
   program code for representing the first probabilistic data structure as a first Bloom filter having a first array of bits having a predetermined bit length and the second probabilistic data structure as a second Bloom filter having a second array of bits having the predetermined bit length; and
   program code for setting bits in the first array of bits, which correspond to the hash values for the first collection of information, to a first bit value;
   program code for setting bits in the second array of bits, which correspond to the hash values for the second collection of information, to the first bit value; and
   the program code for comparing the first probabilistic data structure to the probabilistic data structure comprises:
      program code for determining a first number of bits in the first array of bits that are set to a second bit value different from the first bit value;
      program code for determining a second number of bits that are set to the second bit value in both the first and second army of bits;
      program code for determining a third number of bits in the second array of bits that are set to the second bit value;
      program code for computing a first logarithm of a ratio of the first number of bits and the second number of bits;
      program code for computing a second logarithm of a ratio of the predetermined bit length and the third number of bits; and
      program code for computing a ratio of the first computed logarithm and the second computed logarithm as a measure of difference between the first collection of information and the second collection of information.

19. The computer readable storage device of claim 18, wherein the measure of difference provides an estimate of a percentage of the second collection of information that does not appear in the first collection of information.

20. The computer readable storage device of claim 18, wherein the program code for determining the measure of similarity comprises:
   program code for subtracting the ratio of the first computed logarithm and the second computed logarithm from a value of one to provide the measure of similarity between the first collection of information and the second collection of information.

* * * * *

UNITED STATES PATENT AND TRADEMARK OFFICE
CERTIFICATE OF CORRECTION

PATENT NO.         : 7,702,683 B1                                          Page 1 of 1
APPLICATION NO.    : 11/522656
DATED              : April 20, 2010
INVENTOR(S)        : Evan R. Kirshenbaum It is certified that error appears in the above-identified patent and that said Letters Patent is hereby corrected as shown below:

In column 17, line 67, in Claim 8, delete "extractable" and insert -- extractible --, therefor.

In column 18, line 37, in Claim 10, delete "of" and insert -- of: --, therefor.

In column 19, line 12, in Claim 16, after "and" insert -- a --.

In column 20, line 14, in Claim 18, delete "army" and insert -- array --, therefor.

Signed and Sealed this

Tenth Day of August, 2010

David J. Kappos
*Director of the United States Patent and Trademark Office*